(12) United States Patent
Crespin (10) Patent No.: US 9,074,150 B2
(45) Date of Patent: Jul. 7, 2015

(54) TREATMENT CHAIN AND PROCESS FOR THE THERMOCHEMICAL CONVERSION OF A WET FEED OF BIOLOGICAL MATERIAL BY GASIFICATION

(75) Inventor: Pierre Crespin, Le Havre (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 1101 days.

(21) Appl. No.: 12/810,276

(22) PCT Filed: Dec. 23, 2008

(86) PCT No.: PCT/FR2008/052410
§ 371 (c)(1),
(2), (4) Date: Jun. 23, 2010

(87) PCT Pub. No.: WO2009/081082
PCT Pub. Date: Jul. 2, 2009

(65) Prior Publication Data
US 2011/0314736 A1    Dec. 29, 2011

(30) Foreign Application Priority Data

Dec. 26, 2007 (FR) ...................................... 07 09097

(51) Int. Cl.
*B01J 7/00* (2006.01)
*C01B 3/36* (2006.01)
*C10J 3/56* (2006.01)
(Continued)

(52) U.S. Cl.
CPC ............ *C10J 3/56* (2013.01); *C10J 2300/0909* (2013.01); *C10J 2300/0993* (2013.01); *C10J 2300/1807* (2013.01); *C10J 2300/1823* (2013.01); *C10J 2300/1884* (2013.01); *C10K 1/004* (2013.01); *C10K 1/08* (2013.01); *C10K 1/101* (2013.01); *C10K 1/143* (2013.01); *C10K 3/04* (2013.01); *Y02E 50/32* (2013.01); *C10K 3/006* (2013.01); *C10K 3/023* (2013.01)

(58) Field of Classification Search
None
See application file for complete search history.

(56) References Cited

U.S. PATENT DOCUMENTS 3,871,839 A * 3/1975 Moody ........................ 48/197 R
4,069,024 A   1/1978 Fernandes
(Continued)

FOREIGN PATENT DOCUMENTS

EP    1 477 461 A1    11/2004
JP    2007-031492 A    2/2007
(Continued)

OTHER PUBLICATIONS

Carlo N. Hamelinck et al., "Future prospects for production of methanol and hydrogen from biomass", Journal of Power Sources, Sep. 18, 2002, pp. 1-22, vol. 111, No. 1.

*Primary Examiner* — Imran Akram
(74) *Attorney, Agent, or Firm* — Sughrue Mion, PLLC (57) ABSTRACT

The invention relates to a treatment chain for thermochemically converting a wet biomass feed (1) by gasification, which comprises a device (4) for gasifying the feed (3), and a reactor (9) for steam conversion of the CO, which includes water supply means (10), for delivering a syngas (17) having a defined $H_2$/CO ratio, a drying chamber (2) into which the wet feed (1) is injected prior to its subsequent treatment in the gasification device (4), this drying chamber (2) being supplied with a hot gas (15) withdrawn downstream from the gasification device (4) and recycled by pressurizing means (13) into the drying chamber (2).

18 Claims, 4 Drawing Sheets

(51) Int. Cl.
*C10K 1/00* (2006.01)
*C10K 1/08* (2006.01)
*C10K 1/10* (2006.01)
*C10K 1/14* (2006.01)
*C10K 3/04* (2006.01)
*C10K 3/00* (2006.01)
*C10K 3/02* (2006.01)

(56) References Cited

U.S. PATENT DOCUMENTS 4,211,538 A * 7/1980 Eakman et al. ............ 48/197 R
5,171,406 A 12/1992 Shang et al.
6,148,599 A 11/2000 McIntosh et al.
2003/0236311 A1 12/2003 Melnichuk et al.

FOREIGN PATENT DOCUMENTS

| WO | 93/23500 | 11/1993 |
| WO | 2004/009901 A1 | 1/2004 |
| WO | 2004/046279 A1 | 6/2004 |
| WO | 2007/037768 A1 | 4/2007 |

* cited by examiner

TREATMENT CHAIN AND PROCESS FOR THE THERMOCHEMICAL CONVERSION OF A WET FEED OF BIOLOGICAL MATERIAL BY GASIFICATION

The present invention relates to a process and to a line for the gasification treatment of a wet feed of biological material, such as biomass or coal, i.e. a feed containing a significant amount of water such as at least more than 10% by weight.

The thermochemical conversion of biomass by gasification is a technique that has been known and used for a long time. This technology has been the subject of many fundamental research projects and pilot and pre-industrial plants. Originally, the intended applications were mainly heat production and cogeneration, i.e. combined heat and power production.

For example, patent FR 2 899 596 describes a process for producing electric power from biomass, comprising the following successive steps:

a) gasification of the biomass in the presence of air in a rector, advantageously at a temperature above 800° C., in order to obtain a synthesis gas (also called syngas);

b) cooling of the syngas down to a temperature not below 300° C.;

c) scrubbing of the syngas so as to remove substantially all the tar and/or ammonia; and d) injection of the scrubbed gas into at least one gas-fueled engine coupled to an electrical generator, enabling electric power to be produced.

One application has been particularly developed in recent years using what are called BtL ("Biomass to Liquid", i.e. "Biomass to Liquid Fuel") conversion systems through essentially two steps: gasification of the biomass and Fischer-Tropsch synthesis, well known to those skilled in the art, enabling the gas thus obtained to be converted into liquid fuel. For a more detailed description of this technology, the reader may refer for example to the review "Studies in Surface Science and Catalysis", Vol. 152, Steumberg and Dry (Ed.) Elsevier, 2004, Amsterdam, 0-444-51354-X.

A thermochemical conversion process line for manufacturing a syngas, for example a BtL conversion line, typically comprises, starting with a biomass feed, the following sequence of devices well known to those skilled in the art:

a device for drying the feed or, in certain cases, a roasting device or the like;
a device for gasifying the dried or roasted feed;
a tar reformer, of the thermal or catalytic type;
a heat exchanger, often used to produce steam;
a dust removal device;
a gas scrubbing device;
a CO conversion reactor using steam (or most commonly known as "water-gas shift reactor") for reducing the amount of CO in the treated gas and for increasing its hydrogen content (by carrying out the reaction $CO+H_2O=CO_2+H_2$) until an $H_2/CO$ ratio close to 2 is obtained in said gas, which is suitable for subsequent conversion of this syngas into liquid hydrocarbons by chemical synthesis using various known processes (for example the Fischer-Tropsch process for which such a ratio is necessary); and
a device for treating the gas in order to ensure in particular that it is desulfurized and decarbonized, in order finally to obtain a syngas that can be used to produce, as already mentioned above, liquid fuels, but also synthetic hydrogen, certain chemicals, or else synthetic natural gas to be burnt in gas or combustion turbines.

In the line described above, certain elements such as the drying and reforming devices are optional, depending on the type of biomass feed to be treated.

In other particular cases, certain items of equipment may be added, such as for example a hot dust precipitator upstream of the heat exchanger.

One of the major difficulties usually encountered in this type of biomass conversion line is that it may be necessary to treat a wet feed, comprising 10 to 40% water by weight relative to the weight of dry matter, or even a very wet feed, comprising more than 40% water by weight relative to the weight of dry matter.

The major drawback of this amount of moisture in the feed lies in the reduced thermal efficiency and matter efficiency (in terms of syngas produced) of the gasification line.

Now, the Applicant has demonstrated empirically that a 1% increase by weight of water relative to the weight of dry matter in the feed results in a drop in the gasification temperature of about 14° C. Thus, at fixed gasification temperature for the process, each additional percent of water in the feed must be compensated for by an additional oxygen consumption of 0.2% by weight of biomass feed, which in the end results in an equivalent loss of potential of syngas to be produced.

As an indication, the potential levels of energy that can be released by complete oxidation of the syngas leaving the gasification device or of the syngas before the Fischer-Tropsch conversion step still represent about 85% of the initial potential energy of a biomass feed containing about 20% water by weight relative to the weight of dry matter.

This is why, above a certain moisture content of the feed, it becomes economically worthwhile, or even necessary, to envisage pre-drying the feed.

Such devices for drying the feed to be treated in processes similar to those described above have already been described. In most cases, they are external to the feed treatment line, thereby posing problems of operating at different pressure levels. In other, rarer cases, these drying devices are integrated into the treatment line.

For example, Patent FR 2 249 162 describes a process for gasifying carbon-containing products which comprises the combination of a conversion reaction and a methanation reaction in order to obtain methane and lighter hydrocarbons, in which a drying step is carried out by indirect steam heating, in which the steam is condensed. The drying steam thus produced is, after pressurization in an ejector, injected into the gasification device as gasification agent. The device described is particularly complex.

More pragmatically, Patent GB 617 652 describes in particular a device supplied with wet fuel in order to produce a gas intended for operating a gas turbine, in which a chamber is provided for drying the wet fuel upstream of the gasification device. Circulated in this chamber, in a closed loop, is a hot gas initially produced by the gasifier and indirectly heated, by means of a heat exchanger, by the gas produced by the turbine. This patent describes a specific simplified application of supplying a gas turbine in which it is unnecessary to have a water-gas shift reactor. The gas leaving the turbine cannot be used directly to heat the drying chamber as it is too hot and too rich in oxygen. It is therefore necessary to use a heat exchanger, thereby complicating and increasing the cost of the device. Moreover, GB 617 652 provides no provision for any recovery of the water in the drying gas after it has been cooled. It will be understood that, at the time this patent was filed, the economic and environmental concerns were not those of the present day. These constraints have in particular forced the Applicant to devise and develop a less complex device for drying the feed, which operates more economically and is suitable for the specific applications envisioned by the Applicant.

Thus, in a wet biomass treatment line of the kind described above, the Applicant proposes to provide a simple, integrated and economic technical solution for drying the feed in order to overcome the drawbacks caused by the presence of this moisture that affect the efficiency of the treatment line.

In addition, by means of the present invention, the Applicant proposes, at the same time, to alleviate the problems of lack of running water in certain industrial regions, although it is necessary to have a not inconsiderable amount of water in order to supply the water-gas shift reactor with water, the latter being essential for adjusting the $H_2/CO$ ratio in the syngas that will be subsequently converted to liquid hydrocarbons by chemical synthesis using various known processes (for example the Fischer-Tropsch process).

Thus, the present invention relates to a process for the thermochemical conversion of wet or very wet biological material, such as coal, biomass or organic waste, into a synthesis gas (or syngas) having a defined $H_2/CO$ ratio, in a gasification treatment line that includes at least a step of carried out in a reactor that includes water supply means, which is characterized in that it includes, in the treatment line, prior to the gasification step, a step of pretreating said feed, in which the feed is introduced into a drying chamber, and in that said drying chamber is supplied with a hot drying gas, the latter being formed by a portion of the gas produced in the treatment line, which is withdrawn downstream of the gasification step and recycled by pressurizing means into the drying chamber.

Thanks to this drying chamber, which is integrated directly in the line for treating the biological material upstream of the gasification device, the present invention makes it possible to use a wet feed comprising 10 to 40% water by weight relative to the weight of dry matter, or even a very wet feed, comprising more than 40% water by weight relative to the weight of dry matter, without causing a drop in yield due to the presence of water in the feed.

It is also possible to obtain, compared with a conventional scheme not providing such an integration of the drying means in the treatment line, a higher yield in terms of useful gas and desired final product (a chemical, synthetic fuel, or industrial gas).

The useful production is therefore greater for a given input feed, the air or oxygen consumption used in the gasification device is lower, since it is compensated for by the supply of hot drying gas that enables the moisture content of the feed to be reduced, and the $CO_2$ emissions are also reduced thanks to the recycling of a portion of the gas produced as hot drying gas. In other words, the equipment needed for a portion of the hot gas produced to be recycled back into the drying chamber is not excessive, nor very complicated to carry out; this results in an economically efficient treatment line, which thus means that very wet feeds, the treatment economics of which would not necessarily have been justifiable without the present invention, can be economically accessible and utilizable.

Furthermore, since the portion of hot gas produced which is recycled into the drying chamber is preferably withdrawn downstream of the water-gas shift reactor, a gas that is as dry as possible is recovered, making it very suitable for being recycled into the treatment line as drying gas.

In a variant, the process further includes a gas treatment step, comprising for example a scrubbing operation, carried out downstream of the gasification step and upstream of the water-gas shift step, and the portion of hot gas which is recycled into the drying chamber is withdrawn downstream of said treatment step and upstream of the water-gas shift step.

Advantageously, the portion of hot gas that is recycled into the drying chamber represents between 10% and 60% by volume of the gas flowing through the treatment line at the point of withdrawal of said recycled portion of gas.

Preferably, the feed of biological material to be treated by the device according to the invention has a water content equal to or greater than 10% by weight of water relative to the weight of dry matter. This water content may be up to 200% but preferably will be between 20 and 80% by weight of water relative to the weight of dry matter.

Advantageously, the degree of dehydration of the feed after the pretreatment step is between 70 and 99% by weight, preferably between 90 and 95% by weight.

To monitor the degree of dehydration of the feed entering the gasification device, it is possible to provide a device for monitoring the water content of the feed leaving the drying chamber, enabling the chamber drying conditions to be regulated.

However, if the hot drying gas laden with water after passing through the drying chamber is recycled back into the treatment line, it will be advantageous to install a device for measuring the water content of this hot gas. Such a measurement, combined with the measurement of the flow rate of withdrawn hot gas before it enters the drying chamber, makes it possible for example to determine the degree of dehydration of the feed leaving the drying chamber, enabling the heating conditions in this chamber to be regulated.

Advantageously, the hot drying gas introduced into the drying chamber has a temperature between 200 and 400° C.

According to one particular embodiment of the invention, the means for pressurizing the hot drying gas are a compressor.

Advantageously, during the pretreatment step, the wet feed is introduced into a drying chamber of the fluidized bed type that includes supplementary means for heating the hot drying gas, which means are preferably placed in the drying chamber.

According to another particular embodiment of the invention, the gasification step is carried out by means of a gasification device of the bubbling fluidized bed or circulating fluidized bed type, which device includes means for recycling the hot particles from the cyclone into the drying chamber, thus providing supplementary heating of the hot drying gas.

Alternatively, the invention also provides for the gasification device to be able to be of the allothermic combustion type, i.e. one that uses the heat from an external source (as opposed to autothermal combustion).

It would be possible for the hot drying gas, after having fulfilled its function in the drying chamber, to be recycled for use external to the treatment line described by the invention, or quite simply burnt as flare gas.

However, the Applicant proposes, quite ingeniously, that the drying gas, laden with water after passing through the drying chamber, be recycled into the line for treating the syngas downstream of the gasification step and upstream of the water-gas shift step in order for the water-gas shift reactor to be completely or partly supplied with water.

Thus, the presence of this water-laden gas is put to good use for providing downstream recycling, for boosting the supply of water to said water-gas shift reactor, which it will be recalled requires a water supply in order to operate correctly. This obviously allows appreciable water savings to be made in regions where there is a lack of water and where the present invention can be implemented.

According to yet another particular embodiment of the invention, the process according to the invention further includes, in the treatment line, downstream of the gasification step and upstream of the water-gas shift step, a treatment step comprising at least a heat exchange step and a dust removal step and the drying gas, laden with water after passing through the drying chamber, is recycled into the treatment line upstream of the dust removal step or of the heat exchange step.

The invention also relates to a gasification treatment line for the thermochemical conversion of a wet or very wet feed of a biological material such as coal, biomass or organic waste, into a synthesis gas (or syngas) having a defined $H_2/CO$ ratio, comprising a gasification device, for gasifying the feed, and, downstream of this gasification device, a water-gas shift reactor that includes water supply means, characterized in that it includes, so as to be integrated in line, upstream of the gasification device, a drying chamber for pretreating the wet feed prior to its introduction into the gasification device, and in that this drying chamber is provided with a hot drying gas supply that includes withdrawal means located downstream of the gasification step for withdrawing a portion of the gas produced in the treatment line, and pressurizing means for recycling said withdrawn portion of gas into the drying chamber.

In a variant, the withdrawal means are located downstream of the water-gas shift step.

Advantageously, in another variant, when the treatment line further includes a gas treatment device located downstream of the gasification device and upstream of the water-gas shift reactor, the withdrawal means are located downstream of said treatment device and upstream of the water-gas shift step.

Advantageously, the treatment line includes recycling means, for recycling said drying gas laden with water after passing through the drying chamber into the treatment line downstream of the gasification device and upstream of the water-gas shift reactor, in order for this reactor to be completely or partly supplied with water.

Preferably, when the treatment line further includes a gas treatment device comprising at least a heat exchanger and a dust removal device, located downstream of the gasification device and upstream of the water-gas shift reactor, said recycling means then rejoin the treatment line upstream of the dust removal device or of the heat exchanger.

Advantageously, the pressurizing means are a compressor.

In one embodiment, the drying chamber is of the fluidized bed type and includes supplementary means for heating the hot drying gas, which means may be placed in the drying chamber.

In a variant, the gasification device is of the bubbling fluidized bed or circulating fluidized bed type and includes means for recycling the hot particles from the cyclone into the drying chamber.

In another variant, the gasification device is of the allothermic combustion type.

The treatment line according to the invention is most particularly suitable for implementing the process according to the invention.

The invention also relates to the implementation of the process according to the invention by the treatment line according to the invention.

Finally, as already mentioned earlier, the process or the device according to the invention will be advantageously used for the manufacture of;
  syngas for the manufacture of liquid fuels;
  synthetic natural gas, such as methane;
  synthetic ammonia and synthetic alcohols; or
  synthetic hydrogen.

For this purpose, the $H_2/CO$ ratio will be chosen appropriately.

Figure 1:
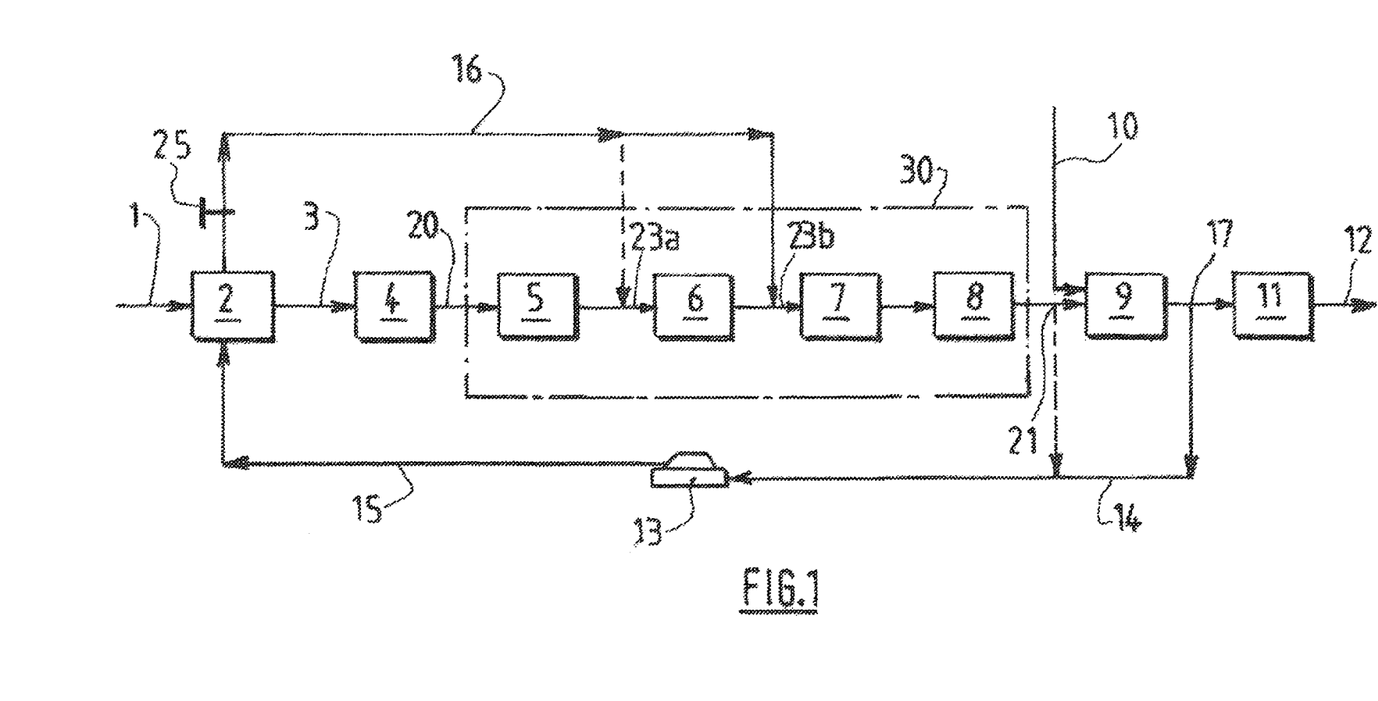
FIG. 1 is a block diagram of a line for treating a wet feed according to the invention.

The invention will now be described below in greater detail with reference to the appended schematic drawings. In these drawings:

FIG. 1 shows a preferred embodiment of a gasification treatment line for the thermochemical conversion, according to the invention, of a wet or very wet feed of a biological material.

The treatment line shown is for example a treatment line of the BtL (Biomass to Liquid) type used to manufacture a syngas 12 from a wet biomass feed 1, such as for example wood or straw.

Figure 2:
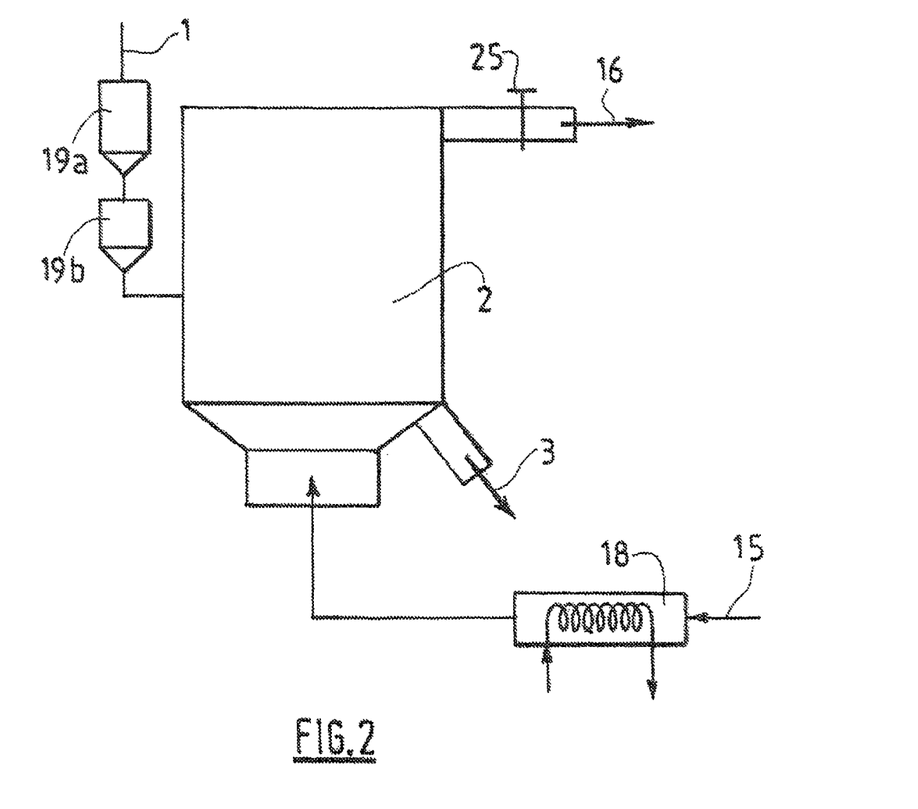
FIG. 2 is a schematic view of a drying chamber as shown in FIG. 1.
Figure 3:
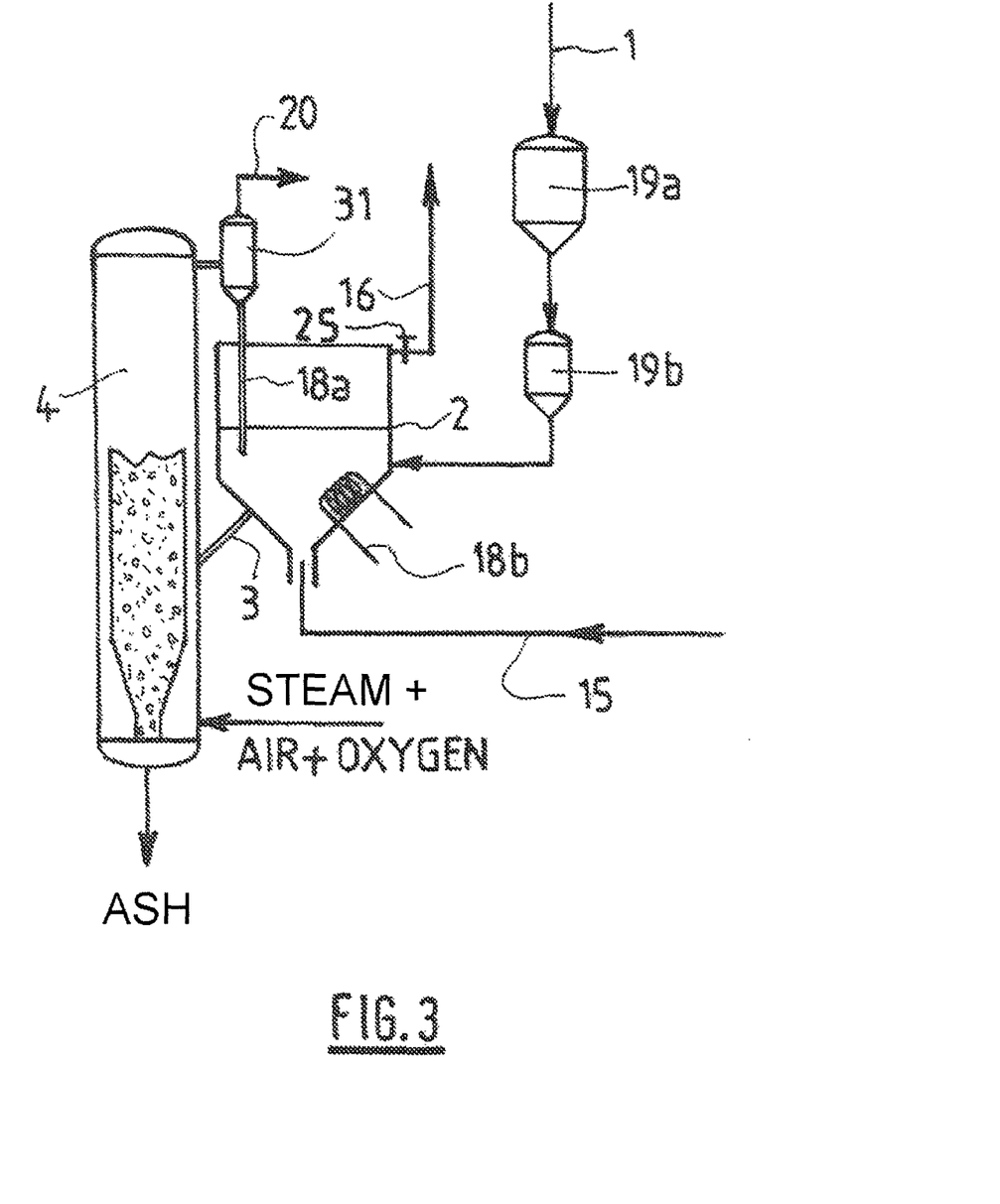
FIG. 3 is a schematic view of a drying chamber and a gasification device as shown in FIG. 1.

This treatment line comprises the following in-line sequence of devices well known to those skilled in the art:
  a drying chamber 2, for drying the feed 1, for example a roasting device or the like, an exemplary embodiment of which is schematically illustrated in FIG. 2, which operates at a temperature generally between 100 and 300° C.;
  a gasification device 4, for gasifying the dried feed 3, exemplary embodiments of which are schematically illustrated in FIGS. 2 and 3, the device producing a gas 20 at a temperature generally between 800 and 1300° C.;
  a treatment device 30 comprising:
    a tar reformer 5 designed to remove the tar contained in the gas 20 produced, of the thermal or catalytic type,
    a heat exchanger 6, of conventional design in the form of a water-circulation coil for example, which is used for example to produce some of the steam needed for the water supply means 10,
    a device 7 for removing dust from the gas 20, and
    a device 8 for scrubbing the gas 20;
  a CO conversion reactor 9 using steam (or most commonly known as "water-gas shift" reactor) 9 that includes a water supply 10, in the form of liquid water or steam, enabling the CO content of the treated gas 20 to be reduced and its hydrogen content to be increased (by carrying out the reaction $CO+H_2O=CO_2+H_2$) until said gas has an $H_2/CO$ ratio suitable for example for subsequently converting this syngas 12 into liquid hydrocarbons by chemical synthesis using various known processes, for example usually the Fischer-Tropsch process developed in particular by the South African company Sasol, but now in the public domain, for which process an $H_2/CO$ ratio of about 2 would then be necessary; and
  a device 11 for final treating of the gas 20, in particular to desulfurize and decarbonize it, for example a device for treatment with amines, various alternative forms of which are also in the public domain, so as finally to obtain a syngas 12 that can be used to produce liquid fuels, but also synthetic hydrogen, certain chemicals, or else synthetic natural gases to be burnt in gas or combustion turbines using technologies that are also known and practiced by "technology-license-leasing" companies or engineering companies.

Referring to this FIG. 1, for the sake of clarity, in particular for properly understanding claim 1, it is necessary to distinguish between the gas 20 produced, a portion of which will subsequently, after treatment as described later in the text, be recycled into the drying chamber 2, from that which is described as synthesis gas or syngas 12, which is the gas recovered (finally "produced") at the end of the treatment line.

In the treatment line described above with the aid of the block diagram of FIG. 1, all the equipment mentioned is known to those skilled in the art and is commercially available. Moreover, the $H_2/CO$ ratio, chosen according to the application, is monitored by known means normally used by those skilled in the art. In particular, a partial by-pass device (not shown) of the reactor 9 is used to adjust the $CO_2$ content at the inlet of the reactor 9, thus contributing to the regulation of said ratio.

The two particularly advantageous and novel features of the invention, which may be implemented separately, but the inventive character of which is enhanced by combining them, will now be described in relation to FIG. 1.

Firstly, the invention provides for a portion of the hot gas 20 produced in the treatment line to be withdrawn downstream of the gasification device 4, but preferably at 17, at the outlet of the reactor 9, in order to withdraw a gas that is as dry as possible, although gas may also be withdrawn at 21, at the inlet of the reactor 9. Preferably, that portion of the gas produced which is recycled into the drying chamber represents between 10 and 60% by volume of the gas flowing through the treatment line at the withdrawal point 17 or 21.

For this purpose, the treatment line includes means for withdrawing the gas produced at 17 or at 21 and pressurizing means 13 for recycling the withdrawn gas portion 14 into the drying chamber 2.

A high percentage portion of gas 20 which can be recycled upstream, further increasing the efficiency of the drying in the chamber 2, is conceivable, as will be seen later in the description, especially because the gas after drying is recycled downstream in the treatment line without this recycling consequently resulting in any loss in syngas to be produced.

At the point of withdrawal 17, the temperature of the withdrawn gas 14 is between 200 and 400° C., so that it appears to be worthwhile to make use of its temperature in order to recycle the gas into the drying chamber 2 and make this heating chamber practically energy self-sufficient.

However, since the pressure of the withdrawn gas 14 is insufficient, owing to the treatments that it has already undergone in the treatment line, a compressor 13 of conventional design is used to raise the pressure of the hot gas 15 from a few bar, typically 3 to 6 bar, to a pressure high enough for it to be injected into the drying chamber 2, where this hot drying gas 15 participates effectively in drying the wet biomass feed 1.

As may be seen in FIG. 2, the feed 1 is introduced into the drying chamber 2 via at least two feed hoppers 19a and 19b, thus providing an airlock system for pressure-sealing the chamber 2 with respect to atmosphere.

The hopper 19b is conventionally pressurized using an automatic sequence by means of an inert gas (typically nitrogen or $CO_2$ recovered from the treatment line of the invention) until obtaining, in this hopper 19b, a pressure above that in the drying chamber 2, so as to enable the hopper 19b to drain into the drying chamber. Supplementary drying means 18 of conventional type, by a coil heat exchanger with circulation of a heat-transfer fluid, may be provided on the inlet line for the already hot drying gas 15 when the wet biomass feed to be dried contains a large amount of water (for example more than 40% water by weight relative to the weight of dry matter). As may be seen in FIG. 3, which will be described in greater detail later, these supplementary heating means 18a and 18b may be installed inside the actual drying chamber 2.

The drying chamber 2 may be of simplified design that further includes an outlet for the dried feed 3 and an outlet for the wet gas 16 (after drying). The Applicant will discuss later the benefit of recycling this gas 16 downstream of the gasification device 4.

In one particular embodiment (not illustrated), the drying chamber 2 could be designed in the form of a roasting device which, in cases of specific feeds, is well suited to the pretreatment of this type of feed before subsequent thermochemical conversion. For example, patent WO 2007/078199 discloses such a roasting device that could be integrated into a wet biomass treatment line according to the present invention.

Figure 4:
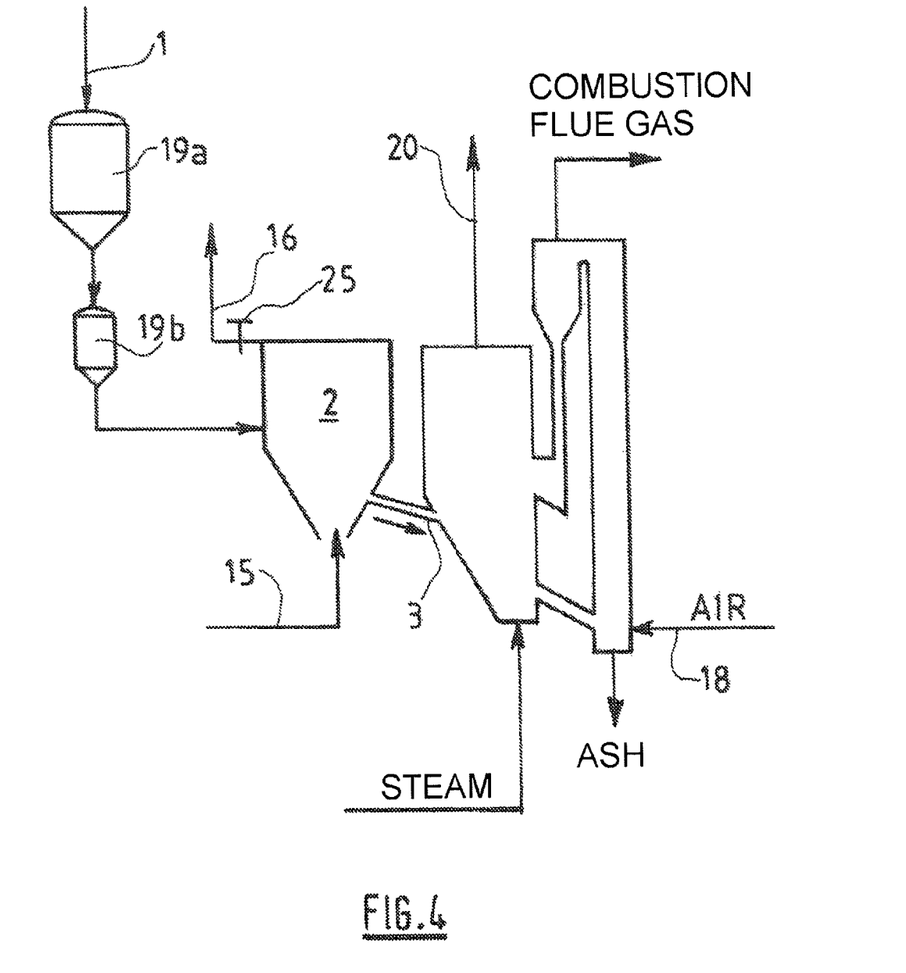
FIG. 4 is a schematic view of an alternative embodiment of a drying chamber and a gasification device as shown in FIG. 1.

FIGS. 3 and 4 illustrate schematically particular embodiments of the gasification device 4 and its association with the drying chamber 2.

In FIG. 3, the gasification device 4 is of known type, with a bubbling bed or circulating fluidized bed. For example, the Swedish company TPS Termiska, the United States company Foster Wheeler, the German company Lurgi and the Japanese company Nippon Steel have already developed this type of device and are capable of designing and supplying constructions thereof suitable for implementing the invention.

One of the particular features of the embodiment described in FIG. 3 lies in a separator 31 for filtering the syngas 20 produced by the gasification device 4 and for recovering, at the same time, the hot particles of the cyclone of the gasification device 4. Said hot particles are then reinjected via an appropriate injection tube 18a (or gravity return leg) into the drying chamber 2 and thus participate, at the same time as the hot drying gas 15, and possibly an optional supplementary drying device 18b placed inside the drying chamber 2, in the drying of the wet biomass feed 1.

In FIG. 4, the gasification device 4 is especially of the type known as an FICB (Fast Internally Circulating Bed) gasifier that was developed for example by the Technical University of Vienna in Austria and the Austrian company AE Energietechnik. Such a device has been manufactured and installed by the company Babcock Borsig Power at Guessing in Austria. For implementing the present invention, the advantageous particular feature of this embodiment will be retained, namely the gasification device 4 that is used to obtain a syngas 20 having a very high calorific value, thereby increasing the drying capacity of that portion of the syngas which is recycled into the drying chamber 2 according to the invention.

For more details about the design principles of the gasification devices that can be implemented according to the invention, the reader may usefully refer to the book "Gasification" (ISBN 0-7506-7707-4) by Christopher Higman & Maarten J. Van der Burgt, published by Gulf Professional Publishing, an imprint of Elsevier, www.gulfpp.com.

In general, in the various exemplary embodiments described, the pressure in the drying chamber 2 will be very close to that in the gasification device 4 and, a priori, slightly higher, so as to allow the biomass feed 1 supplying the gasification device 4 to flow with complete safety. To achieve this, a valve 25 as outlet for the wet gas 16 is provided, in order to regulate, according to a defined operating set point, the pressure difference between the chamber 2 and the gasification device 4, this pressure difference typically being between a few mbar and a few tens of mbar. The pressure downstream of this valve 25 for regulating the gas 16 is significantly lower, of the order of 1 to 3 bar, than that in the drying chamber 2. Thus, the valve 25 as outlet for the gas 16 will be designed so as to be able to discharge, within its regulation range, the flow of the recycled drying gas 16 for said pressure difference.

In a more elaborate system, for meeting a wide regulation and flow rate range according to the design constraints of the drying chamber, it would also be possible to install a two-valve (high-flow/low-flow) system according to the rules of those skilled in the art.

In the particularly advantageous case described later in which the wet drying gas 16 is recycled downstream into the treatment line according to the invention, the pressure downstream of the valve 25 for regulating the gas 16 must remain substantially higher than that at the downstream point where this gas is reinjected (that is, as will be described later, upstream of the shift reactor 9). This pressure characteristic will be obtained by specifying a pressure difference for the valve 25 that regulates the gas 16, which difference will be significantly lower than the pressure drop of the line for treating the gas 20, between the outlet of the gasification device 4 and the reinjection point 23*a* or 23*b* (downstream of the tar reformer 5 or the heat exchanger 6). This pressure drop is typically a few bar and will be provided by an appropriate regulating valve, adding to the pressure drop of the above-mentioned apparatus.

In the case of the gasification devices described above with reference to FIG. 3, the biomass material is permitted to flow between the cyclone of the gasification device 4 and the drying chamber 2 under the effect of gravity: the cyclone of the gasification device 4 must therefore be located at a height sufficient to overcome the slightly negative pressure difference that exists between the outlet for the gas 20 and the drying chamber 2.

The other particularly advantageous and novel feature of the invention, as may be seen in FIG. 1, consists in recycling the water-laden drying gas (16) that has passed through the drying chamber 20 into the line for treating the syngas 20 downstream of the gasification device 4 so as to boost the water supply for the water-gas shift reactor 9. Thus, the presence of this water-laden gas 16 is put to good use for providing downstream recycling that makes it possible at the very least to boost the supply for said water-gas shift reactor 9, which it will be recalled requires a water supply 10 for carrying out the water-gas shift reaction $CO+H_2O=CO_2+H_2$, which serves to adjust the $H_2/CO$ ratio in the syngas 20 at the outlet of the reactor 9. This obviously achieves appreciable water savings in regions where there is a lack of water and where the present invention can be implemented.

According to a particular embodiment of the invention, the drying gas 16 that has passed through the drying chamber 2 and is thus laden with water, is recycled into the line for treating the syngas 20, preferably at 23*b* upstream of the dust-removal step 7 or possibly at 23*a* upstream of the heat exchange step 6. The in-line recycling of this wet gas into the treatment line thus helps to improve the water-gas shift reaction in the reactor 9 and consequently to improve the overall yield of the conversion line.

In other words, the present invention, by combining the recycling of the drying gas for in-line integrated drying of the wet biological feed, and that of the resulting wet gas, into the line for thermochemically converting a wet biological material, provides industrial operators of this type of installation with economically efficient and environmentally friendly technical means by limiting the associated $CO_2$ emissions, in particular when wet or even very wet feeds have to be treated, while improving the yield of syngas produced.

The invention claimed is:

1. A gasification treatment line for the thermochemical conversion of a wet feed into a synthesis gas having a defined $H_2/CO$ ratio, the gasification treatment line comprising:
 a wet feed comprising 10 to 40% water by weight relative to the weight of dry matter, or a very wet feed comprising more than 40% water by weight relative to the weight of dry matter, of a biological material such as coal, biomass or organic waste;
 a gasification device in fluid communication with the feed;
 a water-gas shift reactor downstream of the gasification device that includes water supply means;
 a first gas treatment device located downstream of the gasification device and upstream of the water-gas shift reactor;
 a second gas treatment device for final treatment of the synthesis gas located downstream of the water-gas shift reactor, and configured to withdraw a portion of the gas produced in the treatment line;
 a drying chamber integrated in line and upstream of the gasification device for pretreating the wet feed prior to its introduction into the gasification device, said drying chamber provided with a hot drying gas supply that includes withdrawal means located downstream of the first gas treatment device and upstream of the second gas treatment device;
 pressurizing means for recycling said portion of gas withdrawn from said withdrawal means into the drying chamber via the hot drying gas supply of the drying chamber, wherein said hot drying gas is at a temperature between 200 and 400° C.; and
 recycling means for recycling said drying gas laden with water after passing through the drying chamber into the treatment line downstream of the gasification device and upstream of the water-gas shift reactor to completely or partly supply the water-gas shift reactor with water.

2. The treatment line as claimed in claim 1, characterized in that the pressurizing means are a compressor.

3. The treatment line as claimed in claim 1, characterized in that the drying chamber is of the fluidized bed type and includes supplementary means for heating the hot drying gas.

4. The treatment line as claimed in claim 3, characterized in that the supplementary means for heating the hot drying gas are placed in the drying chamber.

5. The treatment line as claimed in claim 1, characterized in that the gasification device is of the bubbling fluidized bed or circulating fluidized bed type and includes means for recycling the hot particles from a cyclone into the drying chamber.

6. The treatment line as claimed in any claim 1, characterized in that the gasification device is of the allothermic combustion type.

7. A process for the thermochemical conversion of a wet feed into a synthesis gas having a defined $H_2/CO$ ratio in the gasification treatment line of claim 1, wherein the process comprises at least a step of gasifying the feed and a water-gas shift step, the water-gas shift step being carried out in the water-gas shift reactor.

8. The thermochemical conversion process as claimed in claim 7, characterized in that said portion of gas produced which is recycled into the drying chamber is withdrawn subsequent to the water-gas shift step.

9. The thermochemical conversion process as claimed in claim 7, which further includes a step of treating the gas produced subsequent to the gasification step and prior to the water-gas shift step, characterized in that said portion of gas produced which is recycled into the drying chamber is withdrawn subsequent to said treatment step and prior to the water-gas shift step.

10. The thermochemical conversion process as claimed in claim 9, wherein the treatment step includes a scrubbing operation.

11. The thermochemical conversion process as claimed in claim 7, characterized in that said portion of gas produced is recycled into the drying chamber, wherein said recycled portion of gas represents between 10% and 60% by volume of the gas flowing through the treatment line at the point of withdrawal of said recycled portion of gas.

12. The thermochemical conversion process as claimed in claimed 7, characterized in that the feed of biological material has a water content equal to or greater than 10% relative to the weight of dry matter.

13. The thermochemical conversion process as claimed in claim 7, characterized in that the degree of dehydration of the feed after the pretreatment step is between 70 and 99% by weight.

14. The thermochemical conversion process as claimed in claim 13, wherein the degree of dehydration of the feed after the pretreatment step is between 90 and 95% by weight.

15. The thermochemical conversion process as claimed in claim 7, characterized in that the drying gas laden with water after passing through the drying chamber is recycled into the treatment line subsequent to the gasification step and prior to the water-gas shift step in order for the water-gas shift reactor to be completely or partly supplied with water.

16. The thermochemical conversion process as claimed in claim 7, which further includes a step of treating the gas, subsequent to the gasification step and prior to the water-gas shift step, said treatment step comprising at least a heat exchange step and a dust removal step, characterized in that the drying gas is laden with water after passing through the drying chamber, and the drying gas is recycled into the treatment line prior to the dust removal step or the heat exchange step.

17. A method for producing a synthesis gas for the manufacture of liquid fuels, a synthetic natural gas, synthetic ammonia, synthetic alcohols or synthetic hydrogen, comprising the process for the thermochemical conversion of a wet feed as claimed in claim 7.

18. A gasification treatment line for the thermochemical conversion of a wet feed into a synthesis gas having a defined $H_2/CO$ ratio, the gasification treatment line comprising:

a wet feed comprising 10 to 40% water by weight relative to the weight of dry matter, or a very wet feed comprising more than 40% water by weight relative to the weight of dry matter, of a biological material such as coal, biomass or organic waste;

a gasification device in fluid communication with the feed;

a water-gas shift reactor downstream of the gasification device that includes water supply means;

a first gas treatment device located downstream of the gasification device and upstream of the water-gas shift reactor;

a second gas treatment device for final treatment of the synthesis gas located downstream of the water-gas shift reactor, and configured to withdraw a portion of the gas produced in the treatment line;

a drying chamber integrated in line and upstream of the gasification device for pretreating the wet feed prior to its introduction into the gasification device, said drying chamber provided with a hot drying gas supply that includes withdrawal means located downstream of the gasification device and upstream of the device for final treating of the synthesis gas;

pressurizing means for recycling said portion of gas withdrawn from said withdrawal means into the drying chamber via the hot drying gas supply of the drying chamber, wherein said hot drying gas is at a temperature between 200 and 400° C.;

recycling means for recycling said drying gas laden with water after passing through the drying chamber into the treatment line downstream of the gasification device and upstream of the water-gas shift reactor to completely or partly supply the water-gas shift reactor with water; and wherein the withdrawal means are located downstream of the first gas treatment device and upstream of the water-gas shift reactor, and the first gas treatment device comprises at least a heat exchanger and a dust removal device located downstream of the gasification device and upstream of the water-gas shift reactor, such that the recycling means rejoin the treatment line upstream of the dust removal device or of the heat exchanger, and wherein the heat exchanger furnishes a water steam to the water-gas shift reactor via the water supply means.

* * * * *